United States Patent [19]

Narang et al.

[11] Patent Number: 4,837,097

[45] Date of Patent: Jun. 6, 1989

[54] OPTICAL SHIELD FOR LIQUID CRYSTAL DEVICES AND METHOD OF FABRICATION

[75] Inventors: Ram S. Narang, Fairport; Alain E. Perregaux, Pittsford; Eugene C. Faucz, Webster, all of N.Y.

[73] Assignee: Xerox Corporation, Stamford, Conn.

[21] Appl. No.: 134,334

[22] Filed: Dec. 17, 1987

[51] Int. Cl.$^4$ ............................ G02F 1/13; G03C 9/00
[52] U.S. Cl. .................................... 430/5; 430/7; 430/294; 350/339 F
[58] Field of Search ........................... 430/5, 7, 294

[56] References Cited

U.S. PATENT DOCUMENTS

| | | | |
|---|---|---|---|
| 4,241,166 | 12/1980 | Klupfel et al. | 430/294 X |
| 4,311,773 | 1/1982 | Kaneko et al. | 430/7 |
| 4,370,405 | 1/1983 | O'Toole et al. | 430/312 |
| 4,383,017 | 5/1983 | Hirofumi et al. | 430/294 X |
| 4,487,481 | 12/1984 | Suzawa | 350/345 |
| 4,567,132 | 1/1986 | Federicks et al. | 430/312 |
| 4,568,631 | 2/1986 | Badami et al. | 430/315 |
| 4,589,732 | 5/1986 | Shiraishi et al. | 350/331 R |
| 4,595,259 | 6/1986 | Perregaux | 350/331 R |

FOREIGN PATENT DOCUMENTS

| | | | |
|---|---|---|---|
| 59-22050 | 2/1984 | Japan | 430/5 |
| 2125202 | 2/1984 | United Kingdom . | |

*Primary Examiner*—Roland E. Martin
*Attorney, Agent, or Firm*—Robert A. Chittum

[57] ABSTRACT

An optical shield for a liquid crystal dot shutter image bar and fabrication process therefor. In one embodiment, a layer of dye-in-photoresist is formed on the interior surface of one of the glass substrates and over the one or more electrodes thereon. The photoresist layer is exposed through a mask and developed to form an optical shield having the desired configuration of optical apertures and a thickness of 2 to 3 micrometers. Alternate embodiments use two separate dye loaded layers that do not react with each other or dissolve in similar solvents. The first layer is dye loaded PMMA layer covered by a dye-in-photoresist. The dye can be selected to filter any desired spectral region.

19 Claims, 3 Drawing Sheets

U.S. Patent Jun. 6, 1989 Sheet 3 of 3 4,837,097
FIG. 3
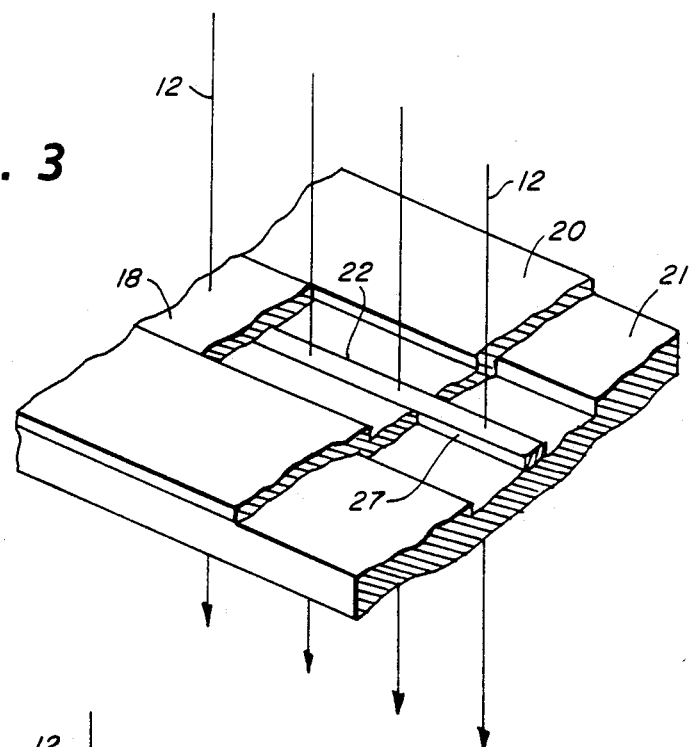
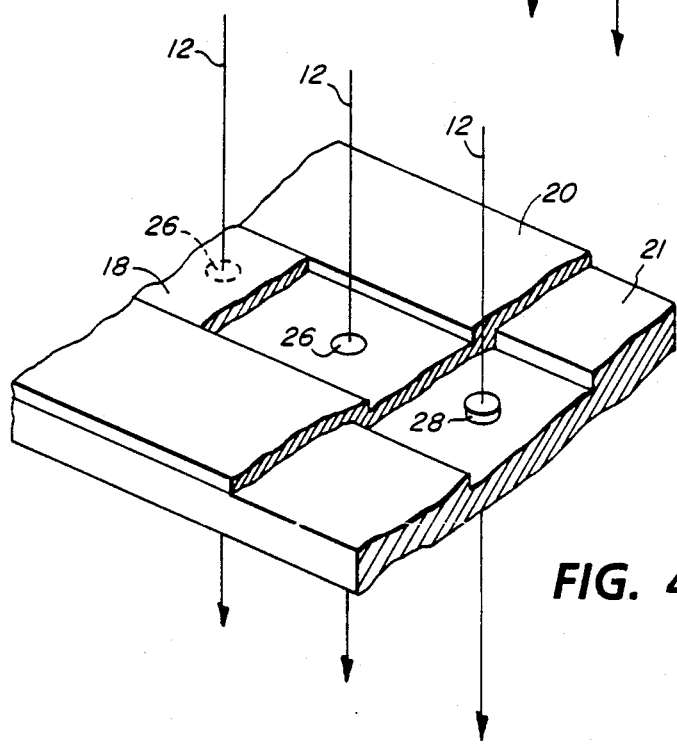
FIG. 4

OPTICAL SHIELD FOR LIQUID CRYSTAL DEVICES AND METHOD OF FABRICATION

BACKGROUND OF THE INVENTION

1. Field of the Invention

The present invention relates generally to liquid crystal devices arranged in an image bar configuration for use in electrophotographic printers and, more particularly, to an improved optical shield for such liquid crystal image bars, together with a method of fabrication thereof.

2. Description of the Prior Art

In a typical transmissive type liquid crystal device, a thin layer of liquid crystal material sandwiched between parallel transparent glass substrates bearing transparent patterned electrodes on their inner confronting surfaces. At least one polarizer is located on the outer surface of one of the glass substrates and a light source is spaced from the device and directs light therethrough. By selectively applying an electric field across the layer of liquid crystal material by means of an A.C. voltage to the electrodes, the transmissivity of liquid crystal device be changed for passing or blocking light in accordance with the electrodes addressed by the voltage.

U.S. Pat. No. 4,595,259 Perregaux discloses a transmissive type liquid crystal device arranged in an image bar configuration. The image bar has a nematic liquid crystal material sandwiched between elongated glass substrates with an array of transparent electrodes on the confronting surfaces thereof, crossed polarizers, and means for slectively energizing the electrodes with a single frequency voltage. This image bar configuration functions as a linear array of dot shutters, and produces latent electrostatic images on the printer's photoconductive member one line at a time in response to receipt of digitized data signals. During the operational mode, all of the image bar shutters are energized, and in this electrically driven state, the image bar shutters are in their state of lowest transmission. The latent image is produced by selective erasure of precharged background areas on the member. For the erasure to occur, interruption of the driving voltage to selected shutters in response to the data signals cause the selected shutter to enter a light transmitting transient state. The response time in the transmissiveness is arranged to about one millisecond. Consecutively erased spots by the same shutter requires the momentary reapplication of the driving voltage. Because the function of the image bar is relatively independent of temperature and gap thickness, it is very cost effective. A shield is used in this patent to substantially eliminate stray light from entering the liquid crystal material, and hence the photoreceptor. The light is formed from a typical opaque material and generally has a thickness of 2 to 10 micrometers. The formation of the shield material and its subsequent delineation of a slit therein is a separate process completely different from the other fabricating processes for the liquid crystal image bar.

A copending application entitled "Transient State Liquid Crystal Image Bar With Contrast Enhancement", U.S. Ser. No. 937,806, filed Dec. 4, 1986, by Dir et al, and having the same assignee as this invention, discloses an improvement over the above patent to Perregaux. Enhanced contrast with lower required driving voltage is achieved by an optical compensator or a thin prism placed between the polarizer and the liquid crystal cell. In another embodiment, a quarter-wave plate is placed between the cell and the analyzer. A slight rotation of the analyzer about its optical axis increases extinction of light exiting from the cell.

U.S. Pat. No. 4,311,773 to kaneko et al discloses a method of producing color filters. The method includes coating a photosensitive material on a substrate and exposing the coating to ultra-violet light through a predetermined pattern. A solvent is used to remove select portions of the photosensitive coating. The remaining portions of the photosensitive coating are then dyed into a desired color.

U.S. Pat. No. 4,370,405 to O'Toole et al discloses a multi-layer photoresist process utilizing an absorbent dye. A resist layer is deposited on a substrate which contains a dye layer on its surface. The dye layer absorbs light of the wavelength used to expose the top layer of the resist material, therefore, protecting the substrate from unwanted exposure. The aim of this patent is to improve line resolution and uniformity. The photoresist line width control problems due to scattering and reflection from the substrate-resist interface can be solved by reducing or eliminating the substrate reflection. Line width control problems arising from surface topography are eliminated by using a multi-level resist process with the lower level of the photoresist containing an absorbent dye, this dye significantly reduces the substrate-resist interface reflections problem.

U.S. Pat. No. 4,487,481 to Suzawa discloses a liquid crystal display panel having a backlight for improving high brightness, uniformity of illumination intensity, and small thickness among other things. The liquid crystal display panel has a side window for allowing light to pass through the liquid crystal layer. Several embodiments of a backlighting technique are disclosed.

U.S. Pat. No. 4,567,132 to Fredericks et al discloses a photolithographic process for forming precise aperture size windows in a photoresist layer. The process utilizes two photoresist layers. The layers are exposed to ultra-violet light and then baked. The layers are developed by using a solvent in which the first layer is soluble and the second layer is insoluble. The characteristics of the differing photoresist layers allows for precise control of the cross-sectional dimension of the windows in the photoresist layer. U.S. Pat. No. 4,568,631 to Badami et al discloses a photolithographic process for producing resist lines in the micron and submicron range. A photoresist is applied to a substrate, exposed to ultra-violet light, and then developed using a solvent. The photoresist is then baked, exposed a second time, and developed using a solvent. This process results in thin resist lines which can be used to form narrow isolation trenches.

U.S. Pat. No. 4,589,732 to Shiraishi et al discloses a liquid crystal image bar containing an array of light valves with a metal mask for restricting the passage of light through the transparent electrodes. U.K. Pat. No. 2,125,202 to Masaki et al discloses a liquid crystal cell comprising a liquid crystal between a pair of electrode supporting plates wherein at least one of the electrode supporting plates is provided with a light intercepting mask which is formed from a water-soluble resin and colored on the area other than the pattern electrode area. The liquid crystal display element may be used in a data recording device for photographically recording some data indicated by the selected segments of the display electrodes onto, for example, a film. The mask is nonconducting so that it may be placed in direct contact with the patterned electrodes. The intercepting mask is formed such that it is transparent where it contacts the transparent electrodes and the remainder of the mask is dyed so that it is non-transparent.

None of the optical shields for the prior art liquid crystal panels and image bars provide an optical shield having a thickness on the order of two microns that is compatible with the liquid crystal cell fabrication, very inexpensive to process, and provides sharp imaging apertures in the optical stop.

SUMMARY OF THE INVENTION

It is an object of the present invention to provide a relatively thin, but substantially opaque, optical shield for a liquid crystal image bar which has a cost effective fabricating process.

In the present invention, an electrically insulative, dyed photoresist layer serves as an optical shield. The shield is formed over the selectively addressable transparent electrodes making up the array of individual dot shutters, and has a thickness of around one to ten micrometers. The optical shield may either have individual apertures photolithographically patterned therein which are aligned with each of the addressable transparent electrodes, or it may have a thin, closely toleranced slit aligned across the centers of the dot shutters.

A more complete understanding of the present invention can be obtained by considering the following detailed description in conjunction with the accompanying drawings wherein like index numerals indicate like parts.

BRIEF DESCRIPTION OF THE DRAWINGS

FIG. 3 is an enlarged, partially shown isometric view of a liquid crystal image bar illustrating the improved light shield of the present invention.

FIG. 4 is the same as FIG. 3, but showing an alternate configuration of the light shield.

DESCRIPTION OF THE PREFERRED EMBODIMENT

Figure 1:
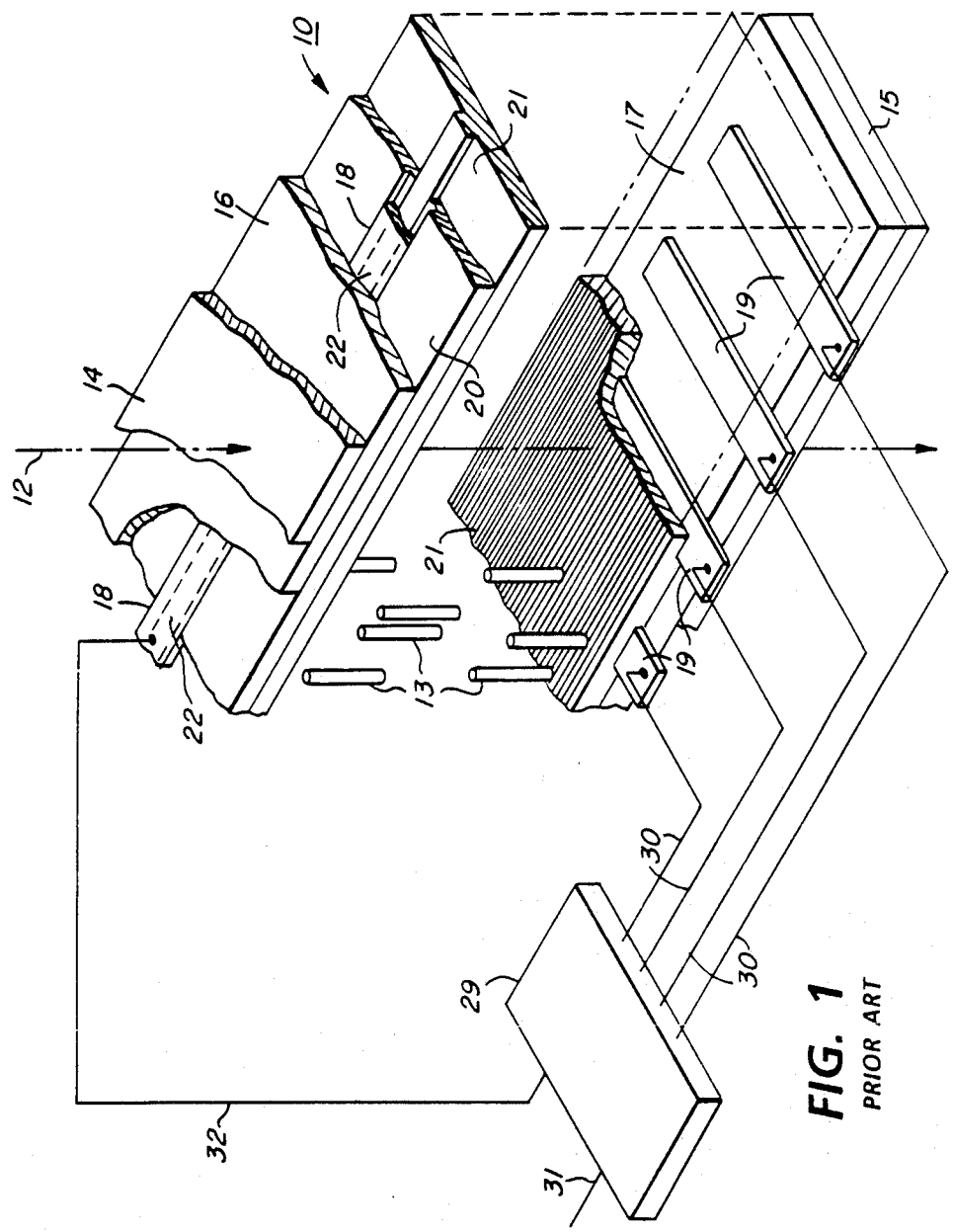
FIG. 1 is an enlarged, partially sectioned perspective view of a schematic diagram of a portion of a prior art liquid crystal image bar, showing an arrangement of transparent electrodes on the transparent glass substrates which form a linear array of dot shutters and showing an optical shield with one elongated slit aperture.

The present invention is an improvement over the transient state liquid crystal image bar disclosed in the above-mentioned U.S. Pat. No. 4,595,259 to Perregaux. In this patent, incorporated herein by reference, there is disclosed an electrophotographic printer (not shown) having a series of process stations through which a photoconductive member passes. A latent electrostatic image is formed on the photoconductive member at the imaging station while the photoconductive member passes thereby. The latent electrostatic image proceeds past a development station, a transfer station, a cleaning station, an erasure lamp, and a precharging corona generating device prior to returning to the imaging station. The imaging station comprises a light source which illuminates a liquid crystal image bar 10, shown schematically in FIGS. 1 and 2. Light having optical axis 12 selectively passes through the image bar and is focused by a lens means (not shown) which may be one or more single lenses, a Selfoc ® lens system, or a plurality of miniature lenses, associated with fiber optics. The image bar 10 selectively allows light to pass to form latent electrostatic images one line at a time by erasing or discharging the image background areas.

The image bar is formed by a single row of dot shutters actuated by selective application of a voltage to the plurality of electrodes 19 on one of the substrates 16, 17 of the image bar. An electronic controller or microcomputer 29 energizes the appropiate electrodes 18, 19 via leads 30, 32 in response to digitized data via lead 31 from, for example, a scanning means such as a charge coupled device or digitized data from a source outside the printer, for example, from a character generator, computer, or the like. The image bar of U.S. Pat. No. 4,595,259, shown in FIGS. 1 and 2 comprises a transmissive, nematic liquid crystal device 10 having crossed polarizers 14, 15 such as, for example, Polaroid HN 32 polarizers, marketed by the Polaroid corporation. In this device, these polarizers are attached to each of the outside surfaces of two parallel transparent glass substrates 16, 17. Transparent electrodes 18, 19 are placed on the inner, confronting surfaces of the glass substrates. An optional light shield 20 may be used to form a slit along the center portion of single electrode 18 on substrate 16 which runs the length of the liquid crystal image bar 10. The dot shutters are formed by the plurality of parallel electrodes 19 on substrate 17 which are perpendicular to electrode 18. A transparent alignment layer 21 covers the electrodes 18, 19 and, if a light shield is used, the alignment layer covers it as well. a thin layer of nematic liquid crystal material, such as Merck No. 1132 from the E. Merck Company of Darmstadt, West Germany, and having a thickness "d" of approximately 10 micrometers is sealingly positioned between the glass substrates having the electrodes 18, 19. The liquid crystal material known as E7 or E44 manufactured by the British Drug House (BDH), Poole, England, are also suitable materials for the liquid crystal image bar.

Figure 2:
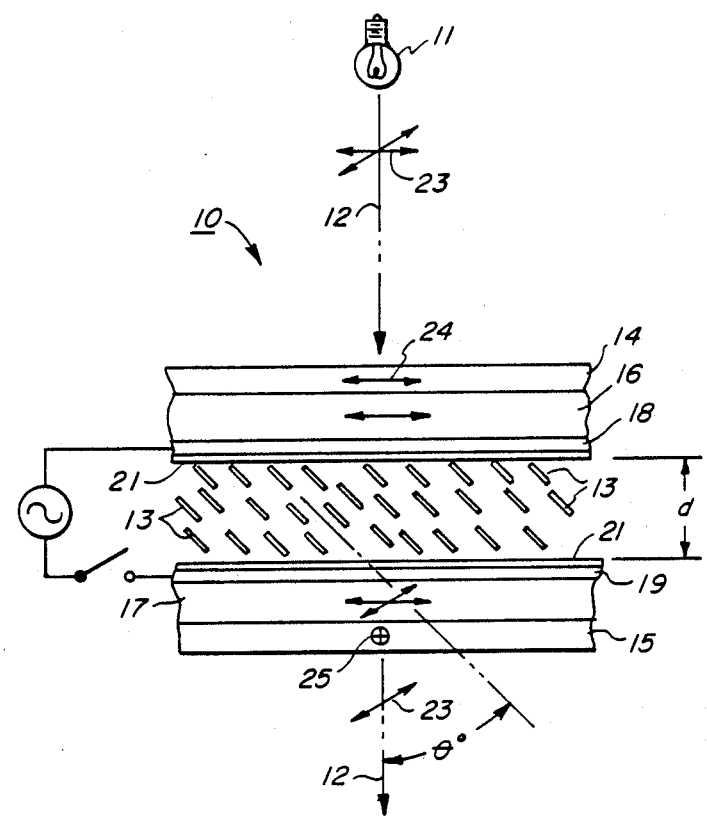
FIG. 2 is a cross-sectional elevation view of a schematic diagram of a liquid crystal image bar of FIG. 1 illustrating the orientation of the liquid crystal molecules in the transient or transmissive state.

In FIG. 2, the polarizing axes of the two polarizers 14, 15, are positioned on the glass substrates 16, 17 so that they are mutually perpendicular to each other and so that they are at a 45 degree angle with respect to the main axes of the liquid crystal molecules 13 when the molecules are in their relaxed states; i.e., when they are lying parallel to the glass substrates. Light depicted as vectors 23 from source 11 enters the device 10 through the upper polarizer 14 on glass substrate 16. However, only the light vector parallel to the transmission axis 24 of polarizer 14 enters the liquid crystal material and, because of the orientation of the polarizers with respect to the main axis of the liquid crystal molecules in their relaxed state, the amount of light that is transmitted by the second polarizer 15 is strongly wavelength dependent. In other words, due to birefringence of the liquid crystal molecules, the light transmitted by the system in its non-energized state is made of a complex color mixture. In the electrically driven state, the polarized light is blocked by the second polarizer or analyzer 15 on glass substrate 17 because the transmission axis 25 of the polarizer 15 is perpendicular to that of the polarizer 14 and because the state of polarization of the light is essentially left unmodified by the liquid crystal molecules regardless of the wavelength.

As a consequence, all areas of the device that are not energizable will transmit a certain amount of stray light which may be damaging to the printing process. For this reason a light shield (not shown) blocking this stray light should be incorporated into the device in order to increase the contrast thereof. Although light shields per se are known for use in liquid crystal image bars, none are compatible with the fabricating process of the liquid crystal cell itself and none are capable of having a small thickness of around one to three micrometers and yet provide a substantially opaque mask that is both readily patterned and electrically non conductive.

In the present invention, an optical mask, more fully discussed later, is provided directly over the transparent electrode 18 and patterned to form either individual apertures 26 in alignment with the addressable electrodes 19 or a single slit 22. When the electrophotographic printer (not shown) is placed in the operating mode, all of the electrodes are energized to maintain the liquid crystal molecules in their stable electrically driven state. In the crossed polarizer configuration, this is the non-transmissive state.

As is well known in electrophotography, any portion of the photoconductive member, which receives light, becomes conductive and dissipates surfaces charges thereon. Accordingly, to form a latent electrostatic image, the background regions of the image must be exposed to light. Therefore, when a liquid crystal device is used as an image bar, it is the transmissive state which is used as an erasure state and, accordingly, this transmissive state must be short and well controlled, if the latent images are to be produced on a moving photoconductive member by the liquid crystal device one line at a time. As discussed in U.S. Pat. No. 4,595,259, this is accomplished by selective interruption and reapplication of the voltage to the electrodes 19 on glass substrate 17. This interruption and reapplication of the voltage to the electrodes 19 cause the liquid crystal molecules to enter a transient state wherein short bursts of light are transmitted through the liquid crystal image bar.

The prior art device of FIG. 2 depicts the liquid crystal molecules 13 as they begin to relax from their electrically driven state, where they are theoretically perpendicular to glass substrates 16, 17, towards their relaxed or rest state, where they are parallel to the glass substrates. During this process, the liquid crystal molecules in this transient state cause the liquid crystal device to go through a succession of maximum and minimum transmission states, as the effective birefringence of the medium goes from 0 to its maximum as a function of molecular orientation (angle $\theta$).

The limited contrast exhibited by the device described in U.S. Pat. No. 4,595,259 at low voltages is caused both by the incomplete tilt of the molecules in their actual energized state and by an insulative light shield which is either too thick or not opaque enough. Although the liquid crystal molecules shown in FIG. 1 are depicted as being perfectly perpendicular to the glass substrates and parallel to the electric field produced by the electrodes 18, 19, in actuality, these molecules have a slight tilt. As a consequence, the linearly polarized light entering the liquid crystal bar comes out of it slightly elliptically polarized and is incompletely absorbed by the lower polarizer or analyzer, assuming, of course, that the crossed polarizer configuration is used as depicted in FIG. 2. Thus, as disclosed in the above-mentioned patent application to Dir et al, a well chosen optical compensator or retardation plate placed between the liquid crystal image bar and the analyzer can convert this elliptically polarized light into a linearly polarized light and allow it to be properly blocked by the analyzer when the device is in the fully energized state.

This invention is for improved light shields of the type useful in liquid crystal devices, such as those depicted in FIGS. 1 and 2, and described in U.S. Pat. No. 4,595,259, as well as for the methods of fabrication respectively thereof.

In one embodiment, the method consists of dissolving a Sudan Black dye in a photoresist, such as, for example, 1350J sold by Shipley Corporation, Newton, MA, and subsequently spin coating this dye-in-photoresist solution over the surface of glass substrate 16 and electrode 18 thereon at a predetermined rpm, generally 1500 to 2500 rpm for two or three minutes. The coating is about 2 micrometers thick, and the dye is 2 to 3 percent by weight, based on the total weight of the photoresist. Examples of other suitable dyes are Resiren Red and Macrolex Green, and another suitable photoresist is 1400-31 by Shipley. The dyes may be obtained from the Mobay Chemical Corporation, Rockhill, SC. Following this coating step, the film formed by the coating of dye-in-photoresist is soft baked at 80°-85° C. for 20 minutes, and then the film is exposed to UV radiation through a mask to delineate the slit 22 or an array of individual apertures 26, thus forming the light shield 20 of FIGS. 3 or 4. The slit has a width "t" of approximately 50 to 100 micrometers and the array of individual apertures each have an approximate diameter of 50 to 85 micrometers. The UV radiation energy level is about 5 mW/cm$^2$ and the exposure period varies from 10 seconds to 5 minutes, depending upon the nature of the dye dissolved, its concentration in the photoresist, and the thickness of the film. The exposed film is next developed in a developer solution such as AZ 351 sold by the Shipley Corporation diluted with an equal quantity of water for a total period of one minute. To complete the development, two successive exposure and development steps are required, when dye concentration is high and the light shield is 5 $\mu$m or thicker. The glass substrate, transparent electrode, and patterned film are thoroughly washed in a stream of deionized water for about 15 minutes. Following the wash, the substrate with electrode and light shield is annealed at 150° C. for 18 hours to fully hard bake the dye-in-photoresist light shield. The patterned film or light shield 20 so obtained is not attacked even by a cold resist remover solution, such as Microposit Remover 140 by Shipley for periods of up to about one hour. The substrate 16 with electrode 18 and light shield 20 is subsequently washed in methanol and a thick transparent alignment layer 21 of Parylene ® is evaporated onto the surface of the substrate having the electrode and light shield, so that the light shield aperture is filled forming the rib 27 as seen in FIG. 3 or posts 28 as seen in FIG. 4. The Parylene ® layer 21 is then rubbed by means well known in the art to form the parallel grooves for alignment of the liquid crystal molecules 13 in their fully relaxed state. The optical shield, comprising the hard baked dye-in-photoresist, is resistant to damage, so that the rubbing treatment of the alignment layer 21 will not injure it. The glass substrate 17 with the multiple parallel and equally spaced electrodes 19 are similarly covered with a Parylene ® alignment layer which is also rubbed to produce the alignment grooves. The liquid crystal cell may now be assembled by using an outer seal (not shown) and glass beads to hold the plates parallel and spaced from each other about 10 micrometers. The alignment layers on the plates confront each other, so that when the liquid crystal material is introduced into the space between the plates, the alignment grooves orient the liquid molecules 13.

Even accelerated testing of these liquid crystal devices at elevated temperatures for periods of up to 1500 hours have shown the light shield to retain completely its integrity, thereby showing that this combination of dye-in-photoresist is extremely useful as a mask for optically shielding the inactive areas of the liquid crystal device from any stray light.

Simply by varying the nature of the dye one can, in principle, make shields for any desired region of the light spectrum. In addition, it has the distinct advantage of being able to vary the extent of transmittance through this light shield by varying the concentration of the dye or the thickness of the film.

In the above embodiment, the light shield for a liquid crystal image bar was fabricated by dissolution of various specified dyes in, for example, 1350J photoresist followed by spinning and etching of the dyed solution. This shield gave an optical contrast of 8:1. In a second embodiment (not shown), a light shield is made up of two separate dye loaded layers, one on top of the other. This provides a capability of increased optical contrast of around 12:1 and higher. In this new approach, the two coatings must be of substances which neither react with each other nor dissolve in similar solvents. This may be accomplished by choosing a dye-loaded photoresist as the top layer, which is subsequently covered by the alignment layer 21, and a dye-loaded poly methyl methacrylate (PMMA) as the bottom layer formed over the surface of substrate 16 and transparent electrode 18. Examples of developers used for each are AZ351 and chlorobenzene, respectively.

The optical shield of this second embodiment is prepared by initially coating the surface of the glass substrate 16 having the elongated transparent electrode 18 with a layer of adhesion promoter, such as, for example, a silane derivative and spinning it at around 3000 rpm for about 30 seconds. Next, a coating having a 15% by weight solution of dye-loaded PMMA in amyl acetate is applied at 1000–1500 rpm for approximately 2 minutes. The dye, for example Sudan Black, is two percent by weight dye, based on the total weight of PMMA. This provides a coating of PMMA and dye having a thickness of 2 to 3 micrometers. Following this, the substrate, with its surface and electrode coated first by the silane derivative and then by the PMMA, is annealed at about 120° C. for one to two hours.

After cooling the glass substrate and coatings to room temperature, the PMMA is spin coated with a layer of dye-loaded 1350J photoresist, which is identical to that of the first embodiment, at 2500 rpm for 1 to 2 minutes and then annealed at 80° to 90° C. for 20–25 minutes. The substrate is then exposed through a mask defining the slit 22 or individual apertures 26 to long wave length UV, i.e., 390 nm, having an intensity of 5 mW/cm$^2$ for 5 minutes. Next, it is developed in a 50% solution of a developer, such as AZ351, for one minute, so that a pattern is etched in the photoresist layer only. The developer for the photoresist does not effect the PMMA layer. The substrate 16 with shield 20 is then washed in a stream of deionized water for about 15 minutes and baked at 120° to 150° C. for one to two hours. Following this, it is plasma etched in an environment of 80% oxygen and CF$_4$ with a 400 W intensity for three minutes. This etches the residual resist layer and also partially etches the exposed PMMA layer. Finally, the substrate 16 is dipped in chlorobenzene for two minutes and the exposed PMMA layer is dissolved to produce the patterned light shield 20 having total thickness of 2.0 to 4 micrometers. This method can also be used to obtain highly absorbing light shields for different regions of the visible spectrum.

A necessary requirement for the proper functioning of the liquid crystal image bar is that the amount of light coming through areas other than the optical windows that are used for exposing the photoconductive member of the printer, such as the slit 22 or individual apertures 26, be as small as possible. This is achieved by masking these areas.

In the above first embodiment of this light shield, filters are made by dissolving one or more different dyes in the 1350J photoresist, followed by suitable patterning to let light through the windows, and then hard-baking the shield at 150° C. to render the resist insoluble in solvents, such as methanol. Such a light shield, though suitable for all regions of the visible spectrum, had an optical contrast limited to around 8:1 and had a thickness of 2.0 micrometers or more. In ultra thin liquid crystal image bars, such as ferro-electric types, the cell thickness is around 4 micrometers or less, so that the optical shields of the above two embodiments are too thick to be satisfactory. However, if one were to reduce the thickness of the light shield to 1.0–1.5 micrometers, a corresponding drop in light absorption and hence optical contrast would occur. This would cause a drastic reduction in copy quality by the printer.

Another embodiment for obtaining a light shield with an optical density of around 2 is by spin coating a film of dye-loaded solution of 15 percent PMMA in amyl acetate, as outlined in the second embodiment above, followed by a top layer of 210 Riston ® instead of photoresist 1350J. Next, the 210 Riston ® is patterned. Thereafter, the PMMA from the exposed areas is removed by plasma etching, along with most of the patterned 210 Riston ®, with a 300 W RF plasma for 4–5 minutes. The residual 210 Riston ® is removed by a Riston stripper, such as S-1100X by the E.I. Du Pont De Nemours & Co., at room temperature.

By using the above procedure, a very uniformly etched slit 22 or plurality of individual apertures 26, as shown in FIGS. 3 and 4, are obtained in the PMMA. Any other geometry of optical aperture could also be obtained, of course. In addition, the method is useful for any region of the visible spectrum simply by changing the dye.

Many modifications and variations are apparent from the foregoing description of the invention, and all such modifications and variations are intended to be within the scope of the present invention.

We claim:

1. A method of fabricating an optical shield for use in a liquid crystal image bar of the type having liquid crystal material disposed between a pair of transparent glass substrates containing transparent electrodes on confronting inner surfaces thereof, the optical shield formed on one of the glass substrate's inner surface and over the transparent electrodes thereon with an opening therethrough for passage of light, and a separate transparent alignment layer formed on each inner substrate surface covering the transparent electrodes and optical shield, the method comprising the steps of:

(a) dissolving a dye in a first liquid photoresist material, the quality of dye being sufficient to render the photoresist substantially opaque;

(b) spreading the dye-loaded photoresist of step (a) over a surface of a transparent glass substrate having at least one transparent electrode thereon to form a first opaque liquid film having a thickness of 1 to 4 micrometers;

(c) solidifying the first liquid film for a predetermined time and temperature to form a first solid opaque film;

(d) forming at least one light passing opening through the first solid film, the opening having a predetermined size; and (e) washing the first solid opaque film with the at least one opening therethrough with methanol and forming a transparent alignment layer thereon.

2. The method of claim 1, wherein the dye is two to three percent by weight, based on the total weight of photoresist.

3. The method of claim 2, wherein the spreading is by spin coating.

4. The method of claim 3, wherein solidifying step is accomplished by baking the glass substrate, electrode, and first liquid film at 80° to 85° C. for 20 to 25 minutes; and wherein the forming of the light passing opening is accomplished by the steps of:

(e) exposing the solidified film to UV radiation through a mask to delineate said light passing opening, the UV radiation energy being about 5 mW/cm$^2$ and the exposure time being for about five minutes;

(f) developing the first film in a developer solution diluted with an equal quantity of water for about one minute;

(g) repeat steps (e) and (f) to fully develop the film in the slit areas;

(h) washing the substrate and first film with the opening in a stream of deionized water for about 15 minutes; and (i) annealing the substrate and first film.

5. The method of claim 4, wherein the dye is Sudan Black sold by the Mobay Chemical Corporation, wherein the photoresist is 1350J sold by the Shipley Corporation, and wherein the annealing step (i) is performed at 150° C. for about 18 hours to fully hard brake the first film.

6. The method of claim 5, wherein the film opening is a slit having a width of 50 to 100 micrometers.

7. The method of claim 5, wherein the film opening is an array of apertures.

8. The method of claim 7, wherein the apertures are circular and each has a diameter of 50 to 85 micrometers.

9. The method of claim 1, wherein the dye in step (a) is also dissolved in a second liquid material, and wherein the second liquid material is spread and solidified over the surface of the glass substrate with at least one transparent electrode prior the first dye-loaded liquid material, so that the light shield is made up of two separate dye-loaded layers, one on top of the other, and wherein the two separate layers are substances which neither react with each other nor dissolve in similar solvents.

10. The method of claim 9, wherein the second liquid material is a 15 percent by weight solution of dye-loaded poly methyl methacrylate (PMMA) in amyl acetate, wherein the dye is Sudan Black and is two to three percent by weight, based on the total weight of the PMMA, and wherein the first liquid material is a photoresist sold by the Shipley Corporation under the trade name 1350J.

11. The method of claim 10, wherein the method further comprises the step of coating the surface of the glass substrate having the transparent electrode with a layer of adhesion promoter.

12. The method of claim 11, wherein the adhesion promoter is a silane derivative, and wherein the coating is accomplished by spinning at around 3000 rpm for about 30 seconds.

13. The method of claim 12, wherein the 15 percent solution of dye-loaded PMMA is applied over the silane derivative by spin coating at 1000 rpm for about two minutes, followed by a solidification step whereby the substrate with the silane derivative and dye-loaded PMMA layers are annealed at about 120° C. for one to two hours, wherein the substrate is cooled to room temperature, and wherein the 1350J photoresist is spin coated over the second solidified layer of dye-loaded PMMA at 2500 rpm for 1 to 2 minutes and then annealed for 20 to 25 minutes at 80° to 85° C.

14. The method of claim 13, wherein the light passing opening is accomplished by the steps of:

(e) exposing the first solidified film to UV radiation through a mask to delineate said light passing opening, the UV radiation energy being about 5 mW/cm$^2$ and the exposure time being for about five minutes;

(f) developing the first film in a AZ 351 developer solution diluted with an equal quantity of water for about one minute in order to etch the delineated opening and expose the second film through said opening;

(g) washing the substrate, the first film, and the exposed portion of the dye-loaded PMMA layer in a stream of deionized water for about 15 minutes;

(h) annealing the substrate and first and second films;

(i) plasma etching the residual part of the first film and exposed portion of the second film of dye-loaded PMMA in an environment of 80 percent oxygen and CF$_4$ with a 400 W intensity for about three minutes; and (j) dissolving the exposed second film of dye-loaded PMMA by dipping the substrate in chlorobenzene for about two minutes, so that a two layer optical shield is formed having a total thickness of 2.0 to 4 micrometers.

15. The method of claim 14, wherein the annealing step (h) is conducted at 120° to 150° C. for one to two hours.

16. The method of claim 15, wherein one or more different dyes may be dissolved in the first film of 1350J photoresist to produce a light shield suitable for all regions of the visible light spectrum.

17. The method of claim 1, wherein the first liquid material is a 15 percent by weight solution of dye-loaded PMMA in amyl acetate, and wherein the dye is Sudan Black sold by the Mobay Chemical Corporation and is two to three percent by weight, based on the total weight of the PMMA, and wherein the substrate with the electrode is cleaned by washing in a stream of deionized water for about 15 minutes to remove any contaminating particles.

18. The method of claim 17, wherein the spreading step (b) is accomplished by spinning the filtered dye-loaded PMMA solution on the precleaned glass substrate surface having the electrode at 1500 to 1800 rpm to achieve a thickness of 2 to 3 micrometers, wherein the solidifying step is performed at about 120° C. for about one hour, and wherein the opening is formed at step (d) by the steps of:
  (i) coating the dye-loaded PMMA film with a layer of photo-patternable material;
  (ii) photopatterning the photopatternable material;
  (iii) plasma etching the patterned photopatternable material and exposed dye-loaded PMMA film; and
  (iv) removing the residual photopatternable material.

19. The method of claim 18, wherein the photopatternable material is 210 Riston ®, the photopatterning is accomplished by exposing the 210 Riston ® to 5 to 7 mW/cm² UV through a patterned mask and then developing to produce the desired light passing opening, the plasma etching is accomplished by a 300W RF plasma for 4 to 5 minutes, and the residual 210 Riston ® is removed by S-1100X Stripper sold by DuPont.

* * * * *